United States Patent [19]

Noda et al.

[11] 4,260,585

[45] Apr. 7, 1981

[54] APPARATUS FOR MANUFACTURE OF LOW-SODA ALUMINA GRANULES

[75] Inventors: Fumiyoshi Noda; Mikio Murachi; Hideaki Ueno, all of Toyota, Japan

[73] Assignee: Toyota Jidosha Kogyo Kabushiki Kaisha, Toyota, Japan

[21] Appl. No.: 878,399

[22] Filed: Feb. 16, 1978

[30] Foreign Application Priority Data

Feb. 16, 1977 [JP] Japan .......................... 52-015685
May 24, 1978 [JP] Japan .......................... 52-060219

[51] Int. Cl.³ .................. B01D 11/02; F28D 7/00; F28D 21/00
[52] U.S. Cl. .................. 422/208; 422/199; 422/200; 422/202; 422/276; 422/280; 422/284; 422/307
[58] Field of Search .......... 423/625, 628; 252/463; 422/199, 200, 202, 207, 208, 295, 297, 298, 299, 26, 307, 275, 276, 280, 284; 106/65; 34/73, 78, 220

[56] References Cited

U.S. PATENT DOCUMENTS

| | | | |
|---|---|---|---|
| 2,713,202 | 7/1955 | Jewell | 422/298 |
| 2,890,162 | 6/1959 | Anderson et al. | 423/625 |
| 3,223,483 | 12/1965 | Osment | 423/625 |
| 3,226,191 | 12/1965 | Osment et al. | 423/625 |
| 3,361,517 | 1/1968 | Skaller | 422/298 |
| 3,410,650 | 11/1968 | Bramson | 422/299 |
| 3,423,292 | 1/1969 | Nichols | 422/280 |
| 3,897,818 | 8/1925 | Champel | 422/26 |
| 3,983,260 | 9/1976 | Ford | 422/26 |
| 4,088,444 | 5/1978 | Byrne | 422/26 |

FOREIGN PATENT DOCUMENTS

45-21319 12/1970 Japan ........................ 423/625
50-161494 12/1975 Japan ........................ 423/625

*Primary Examiner*—Bradley Garris
*Attorney, Agent, or Firm*—Brisebois & Kruger

[57] ABSTRACT

Low-soda alumina granules suitable for use as an alumina porcelain insulator and alumina catalyst carrier, and the method and equipment for their manufacture. The method comprises dehydrating aluminum hydroxide at a high temperature and then granulating it. The granules thus obtained are placed in an autoclave, washed and cured with water drops, then taken out of the autoclave dried and fired. The manufacturing equipment is used for curing the granules with water drops.

5 Claims, 6 Drawing Figures

APPARATUS FOR MANUFACTURE OF LOW-SODA ALUMINA GRANULES

BACKGROUND OF THE INVENTION

Conventionally alumina is obtained by firing aluminum hydroxide, but aluminum hydroxide produced by the Bayer process usually contains 0.3–0.5% $NA_2O$ and accordingly alumina obtained from this aluminum hydroxide contains 0.4–0.5% $Na_2O$. The alumina is produced by dehydrating aluminum hydroxide, followed by granulation, curing, drying and firing at high temperatures of 900°–1110° C. When the $Na_2O$ content is too high, the strength of the alumina as a catalyst carrier drops. For instance, when an auto converter filled with such a carrier which carries a catalyst metal is used, extended vibration causes the carrier to wear and be pulverized and at the same time the efficiency of the catalyst metal as a catalyst deteriorates. For this reason, it is desirable that as little $Na_2O$ as possible be present in the alumina used as the catalyst carrier. The typical known processes developed for this purpose are as follows:

(1) Aluminum hydroxide is partially dehydrated by roasting, and then it is agglomerated by mixing it with water; and the alumina agglomerate obtained is flushed with water (Pat. Pub. SHO 45-40168).

(2) Aluminum hydroxide is roasted at 500°–600° C. and then flushed with an aqueous solution of phenol (Pat. Pub. SHO 34-10620).

(3) Aluminum hydroxide is agitated together with 0.1–5% ammonia solution or an aqueous solution of ammonium salt at 110°–250° C. in an autoclave (Pat. Pub. SHO 32-630).

(4) Alumina or aluminum hydroxide is mixed with calcium chloride; heated at over 800° C.; and then flushed with water or an aqueous solution of hydrochloric acid (Pat. Pub. SHO 34-10621).

(5) Aluminum hydroxide wetted with hydrochloric acid or an aqueous solution of aluminum chloride is roasted within a vessel fabricated of silicious refractory (Pat. Pub. SHO 47-5744).

(6) Aluminum hydroxide is granulated (or agglomerated), roasted at 426°–566° C. and then washed with a dilute acid (U.S. Pat. No. 2,769,688).

(7) Aluminum hydroxide and an aqueous solution of an acid are reacted to yield boehmite at over 177° C. in an autoclave, followed by dehydration and flushing with water (U.S. Pat. No. 2,774,744; U.S. Pat. No. 3,628,914).

(8) Aluminum hydroxide is roasted at 250°–500° C. for 2–6 hours; flushed with a dilute acid solution at room temperature—100° C. and then filtered, followed by drying and firing (U.S. Pat. No. 3,112,279).

In the above processes (1)–(4) and (6)–(8) aluminum hydroxide is roasted and then flushed with a dilute acid; or treated with a dilute acid in an autoclave followed by flushing and filtering, thereby yielding low-soda alumina.

A considerable amount of flush water is consumed in a flushing process for each of these manufacturing methods and the disposal of waste liquid generated in the flushing process is costly; in process (5) there is no flushing process but acid is employed and preventing the acid and acid decompositions from being diffused into the atmosphere is quite expensive.

SUMMARY OF THE INVENTION

The main object of the present invention is low-soda alumina granules, characterized by low soda content with soda contained in the alumina being eliminated; and to an improved method and equipment for the manufacture of such granules.

Another object of the present invention is improvement in the strength of alumina porcelain insulators and catalyst carriers resulting from decreasing the soda content of the alumina.

DETAILED EXPLANATION OF THE INVENTION

After strenuous efforts to work out a method for producing low-soda alumina granules and powder at low cost without the prior difficulties in manufacturing and equipment, the present inventors developed the present invention relating to a manufacturing method and equipment for performing the method.

The method for manufacturing the low-soda alumina granules of this invention is characterized by dehydrating aluminum hydroxide at a high temperature and then granulating it; the granules obtained are placed in an autoclave, where the granules are washed and cured with water or hot water; then the granules are taken out of the autoclave and dried or fired.

The manufacturing equipment of the present invention consists of a cooler installed at the top of and within an autoclave for condensing the saturated steam; and evaporator to evaporate water or hot water within the autoclave; and, a drain pipe provided within the autoclave.

According to the method of the present invention, the granular alumina is washed with water drops condensed from saturated steam within the autoclave having the above properties of high temperature and high pressure; accordingly low-soda alumina can be produced with high efficiency, and the alumina obtained by drying and firing the alumina granules makes a good catalyst carrier with high strength.

The present invention will now be described referring to specific examples.

EXAMPLE 1

Figure 1:
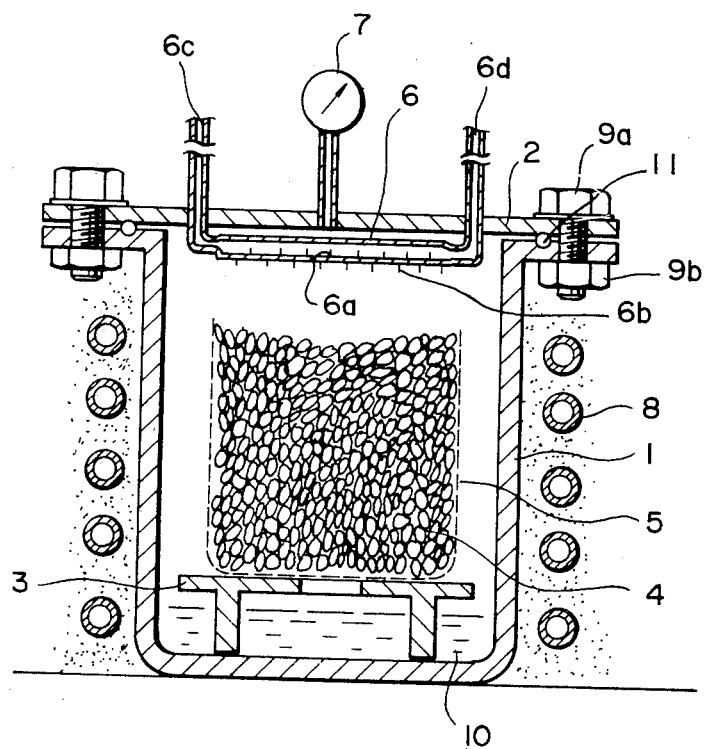
FIG. 1 is a view in vertical section of manufacturing equipment used in a first process of the present invention.

In the apparatus used in this example, there is, as illustrated in FIG. 1, an autoclave 1 with a pressure resistant lid 2. A perforated metal case 5 to hold the granular alumina 4 to be washed is set on a draining stand 3 placed in autoclave 1. At the inside of lid 2 is a flat tube 6 for condensation of saturated steam. A pressure gauge 7 communicates through the lid for measurement of the pressure within the autoclave 1. Tube 6 has an interior coolant guide 6a and exterior fins 6b. The cooling water is circulated through the inlet pipe 6c and the discharge pipe 6d. The autoclave 1 is heated by an external heater 8 installed on the autoclave. The autoclave 1 and the lid 2 are secured together with bolts 9a and nuts 9b. In FIG. 1 the item 10 is water for generation of steam and 11 is a seal or packing between the lid and the autoclave body.

For the purpose of washing the granules 4 in this apparatus, the water which is heated by the heater 8 evaporates and when the temperature exceeds 100° C., saturated steam is produced at a pressure corresponding to the temperature (the apparatus is initially supplied with enough water 10 to maintain the steam saturated at the heating temperatures).

Next, when the cooling water is supplied to the tube 6 through the inlet pipe 6c, the steam around the tube 6 becomes water droplets through condensation, which fall onto the granules 4 to be washed and wash them. In the apparatus of FIG. 1, the cooling water does not wash the granules 4, but only cools the tube 6.

In this example, granules of aluminum hydroxide with a composition given in Table I (grain size: 40μ) were roasted for about one second in a hot gas of 300°–700° C., crushed for 20 minutes in a vibration mill to active alumina powder of about 5μ in average size; the powder thus yielded was then granulated to a size of 2.5–4.5 mm by a dish-type granulating machine. Seven different samples were taken from the granules thus obtained. Separate tests were performed on the samples, each at a different curing temperature of Table 2. During each test, a sample was placed in the case 5 of the autoclave; subjected to 15 hours of treatment; washed at its respective curing temperature (Table 2); then after removal from the apparatus, was dried for one hour at 150° C. Each sample was separated into two batches, one batch was fired for three hours at 850° C. and the other batch was fired for three hours at 1100° C.; and the strength of the alumina granules produced was measured.

For comparison with the alumina carrier granules according to the present invention, alumina control granules were prepared in a manner similar to the above process except that no cooling water was circulated through the tube 6; and their strength was measured.

TABLE 1

| Composition of alumina hydroxide | |
| --- | --- |
| Composition | Proportions (%) |
| $Al_2O_3$ | 64.5 |
| $Na_2O$ | 0.43 |
| $SiO_2$ | 0.01 |
| $Fe_2O_3$ | 0.01 |
| $TO_2$ | 0.01 |
| Burning loss | 34.5 |

The measured strength of the alumina granules is listed in Table 2.

TABLE 2

| | | Strength (Kg/granule) of alumina granules and $Na_2O$ contents | | | | | |
| --- | --- | --- | --- | --- | --- | --- | --- |
| | | Alumina granules according to the present invention | | | Control granules | | |
| Test No. | Curing Temp. (°C.) | Strength (kg) | | | Strength (kg) | | |
| | | 850° C. | 1100° C. | $Na_2O$(%) | 850° C. | 1100° C. | $Na_2O$(%) |
| 1 | 110 | 8.7 | 3.3 | 0.36 | 8.3 | 0.6 | 0.49 |
| 2 | 120 | 9.3 | 4.6 | 0.29 | 9.4 | 1.5 | 0.47 |
| 3 | 140 | 8.8 | 5.2 | 0.18 | 8.8 | 3.0 | 0.42 |
| 4 | 160 | 8.3 | 6.9 | 0.05 | 8.1 | 3.8 | 0.32 |
| 5 | 180 | 6.6 | 6.8 | 0.05 | 6.3 | 4.2 | 0.23 |
| 6 | 200 | 5.1 | 7.1 | 0.03 | 5.2 | 4.1 | 0.24 |
| 7 | 220 | 4.7 | 7.3 | 0.04 | 4.5 | 4.8 | 0.25 |

As seen from Table 2, the alumina granules according to the present invention contain less $Na_2O$ than the control granules at any of the curing temperatures. As for the strength there is no wide difference between the two at a firing temperature of 850° C., but at 1100° C. the strength of the invented alumina granules is higher than that of the control granules and it tends to increase with a decrease in the $Na_2O$ contents.

EXAMPLE 2

Figure 2:
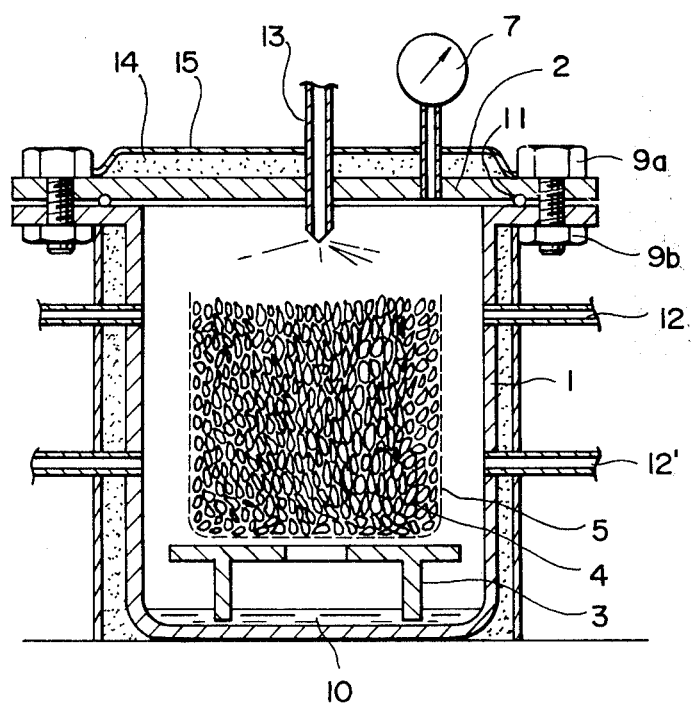
FIG. 2 is a view in vertical section of manufacturing equipment used in second through fifth processes of the invention.

In this example as illustrated in FIG. 2, steam was introduced through a number of supply pipes 12, 12' extending through the side wall of the autoclave 1 and the cooling water was sprayed through a spray nozzle 13 instead of circulating it through the flat tube 6 (FIG. 1) to condense the saturated steam. In the apparatus of FIG. 2, no heater is required; the autoclave 1 and the lid 2 have protective heat insulation 14, which is supported by an outer holding case 15. Otherwise, the construction is the same as in FIG. 1.

When a little cooling water was sprayed through the nozzle 13 of the lid 2, the steam around nozzle 13 condensed to become water drops, which washed the granules 4.

Alumina powder similarly obtained as in Example 1, using the FIG. 2 apparatus, was washed with water drops of the steam supplied through said pipes 12, 12' and condensed by the cooling water sprayed through said nozzle 13. Then using the same curing temperatures and the firing temperatures as in Example 1, alumina granules were obtained. Their strength and $Na_2O$ contents turned out roughly the same as listed in Table 2.

The strength and $Na_2O$ content of alumina control granules obtained with the supply of the cooling water spray stopped were the same as those of ones obtained in Example 1 with the circulation of cooling water to the tube 6 stopped.

EXAMPLE 3

In this example the lid 2 in FIG. 2 was replaced with the one in FIG. 1 and alumina granules were obtained by a similar process to that of Examples 1 and 2. The strength and Na$_2$O contents of these granules turned out roughly the same as listed in Table 2.

EXAMPLE 4

Aluminum hydroxide of the composition given in Table 1 was roasted for one second in a hot gas of 800° C., yielding transient alumina with a burning loss of 5.6%. The transient alumina powder with added water was granulated to a size of 1–5 mm by a dish-type granulating machine. Using the apparatus of FIG. 1, five samples of the granules thus obtained were washed for different times of 5, 10, 15, 20 and 25 hours, respectively, at curing temperatures of 160° C., and five samples were washed for these time periods at 200° C. The granules after removal from the apparatus were crushed to 1–30$\mu$ in a vibration mill and then their Na$_2$O content was measured.

As a control, alumina control granules were obtained in the same way as above except that the circulation of cooling water to the tube 6 was stopped and their Na$_2$O content was measured, the results being summarized in Table 3.

TABLE 3

| | Na$_2$O contents of alumina carrier | | | |
|---|---|---|---|---|
| | Curing | | Na$_2$O content (5) | |
| Test No. | Temperature (°C.) | Time (hr) | Alumina granules according to the present invention | Control |
| 8 | | 5 | 0.32 | 0.44 |
| 9 | | 10 | 0.18 | 0.39 |
| 10 | 160 | 15 | 0.05 | 0.34 |
| 11 | | 20 | 0.03 | 0.29 |
| 12 | | 25 | 0.03 | 0.24 |
| 13 | | 5 | 0.25 | 0.35 |
| 14 | | 10 | 0.12 | 0.26 |
| 15 | 200 | 15 | 0.04 | 0.24 |
| 16 | | 20 | 0.03 | 0.24 |
| 17 | | 25 | 0.03 | 0.22 |

From Table 3 it is evident that the invented alumina granules contain less Na$_2$O than the control granules.

EXAMPLE 5

Aluminum hydroxide of the composition as given in Table 1 was fired for 3 hours in an electric furnace of 550° C. and then crushed to 1–4 mm in granule size by a ball mill. Using the apparatus of FIG. 2, the granules thus obtained were washed for 15 hours at a curing temperature of 160° C. The granules thus washed were fired at 1200° C. and thereafter their Na$_2$O content was measured to be 0.1%. The Na$_2$O content of control granules obtained without spraying cooling water through the nozzle 13 was 0.29%.

EXAMPLE 6

Figure 3:
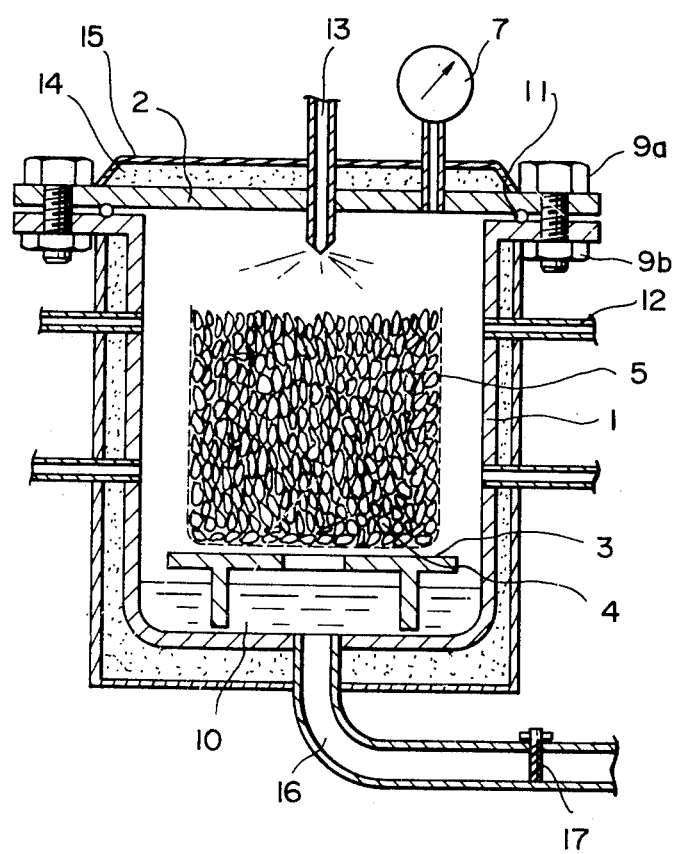
FIG. 3 is a view in vertical section of manufacturing equipment used in a sixth process of the invention.

In the apparatus employed in this example, as illustrated in FIG. 3, a drain pipe 16 and a discharge valve 17 were provided at the bottom of the autoclave 1 in FIG. 2 so that the autoclave 1 could be drained.

Alumina granules were obtained by operating the FIG. 3 apparatus as follows. First, the alumina granules obtained in the same way as in Example 1 were placed in a metal screen case 5, which was set on the water drain stand 3; after setting the packing 11, the lid 2 was applied and sealed by tightening bolt 9a and the nut 9b to provide an airtight apparatus. Next stream was introduced through pipies 12 and the apparatus was held at a curing temperature of 160° C. with saturated steam at a pressure of 6.3 kg/cm$^2$; after one hour of this hydrothermal-state, a pressurized water was sprayed through the nozzle 13.

The pressurized water was sprayed once every hour and this was repeated 20 times. During each spraying the drain was opened and condensed steam and water were discharged through the pipe 16 and the valve 17. The remainder of the process was the same as in Example 5. The control granules were prepared in the same way as above except that there was no spraying through the nozzle 13.

Measurement showed that the Na$_2$O content of the invented alumina granules was 0.05% against 0.32% for the control granules.

From the above results it is evident that according to the present invention in which alumina granules are washed in a hydro-thermal state, crystallinity is rather poor on account of boehmite being formed, but sodium is easy to eliminate and the solubility is good because of the high temperature.

EXAMPLE 7

Figure 4:
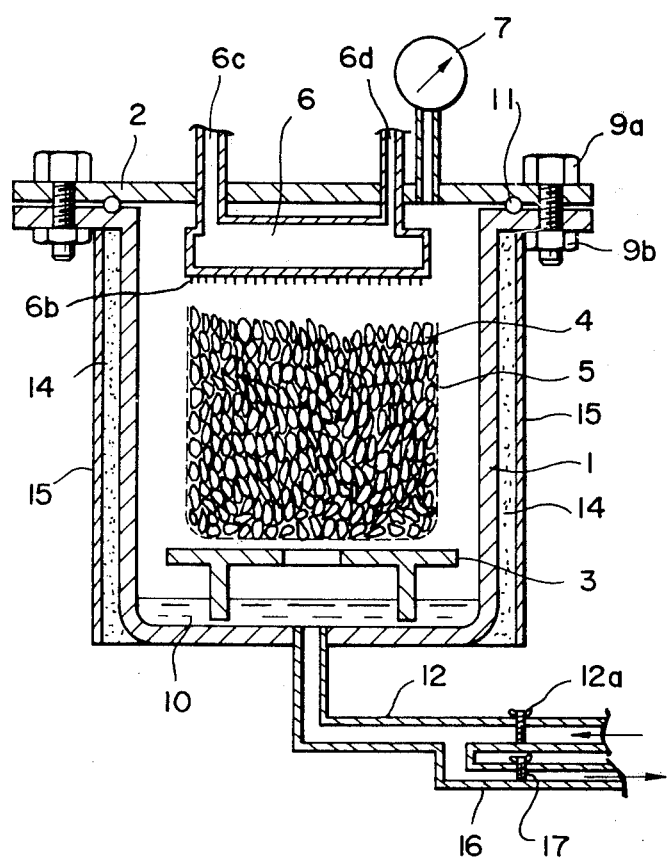
FIG. 4 is a view in vertical section of manufacturing equipment used in a seventh process of the invention.

In the apparatus used in this example, as illustrated in FIG. 4, the steam supply pipes 12, 12' of FIG. 3 were eliminated; the drain pipe 16 served as the steam supply pipe 12; and the drain pipe 16 and the valve 17 were provided extending from the pipe 12. The lid 2 of Example 1 was used, which has a flat tube 6 for condensation of the saturated steam. In FIG. 4, 12a is a steam supply valve.

In this FIG. 4 apparatus the water collecting at the bottom of the autoclave 1 was directly heated by hot steam, the evaporating efficiency was high and the amount of water drainage was small, because there was no spraying of water through a nozzle.

In Example 7, alumina granules of Example 1, just as in Example 6, were heated for 20 hours in a hydro-thermal state at a curing temperature 160° C. and a saturated steam pressure of 6.3 kg/cm$^2$ and during the last 4 hours the granules were washed by condensed steam droplets resulting from cooling water of 15° C. circulated through tube 6 at a rate of 2000 cc per minute.

The temperature of the cooling water at the discharge pipe 6d of the tube 6 was about 25° C.; heat transfer took place at a rate of 20,000 calories per minute; water drops condensed on the outside of tube 6 at a rate of 40 cc per minute; and thus the alumina granules were assumed to have been washed with water at a rate of 40 cc per minute. The alumina granules were obtained in the same way as in Example 5.

Their Na$_2$O content was 0.05%, which shows that the washing effect was the same as in Example 6.

EXAMPLE 8

Figure 5:
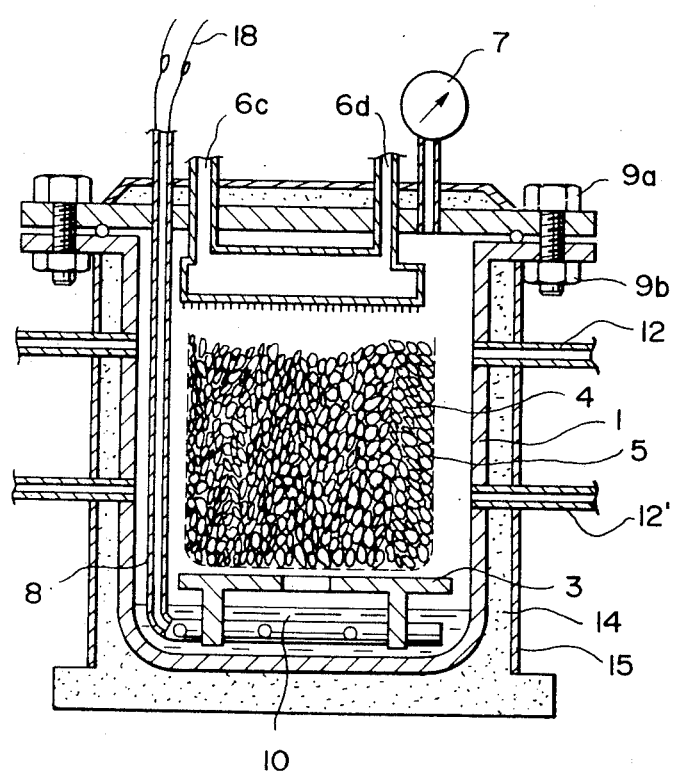
FIG. 5 is a view in vertical section of manufacturing equipment used in an eighth process of the invention.

In the apparatus used in this example, as illustrated in FIG. 5, the lid 2 of FIG. 1 was used with the autoclave of FIG. 2. An electric heater 8 was provided in the bottom water drain area 10; the heater was connected to the heating cord 18 so that the condensed drain water could be transformed into steam.

In the same manner as in Examples 6 and 7, alumina powder was washed, and treated, and alumina granules were obtained. The Na$_2$O content of these granules was 0.05% and there was very little residual drain water.

EXAMPLE 9

Figure 6:
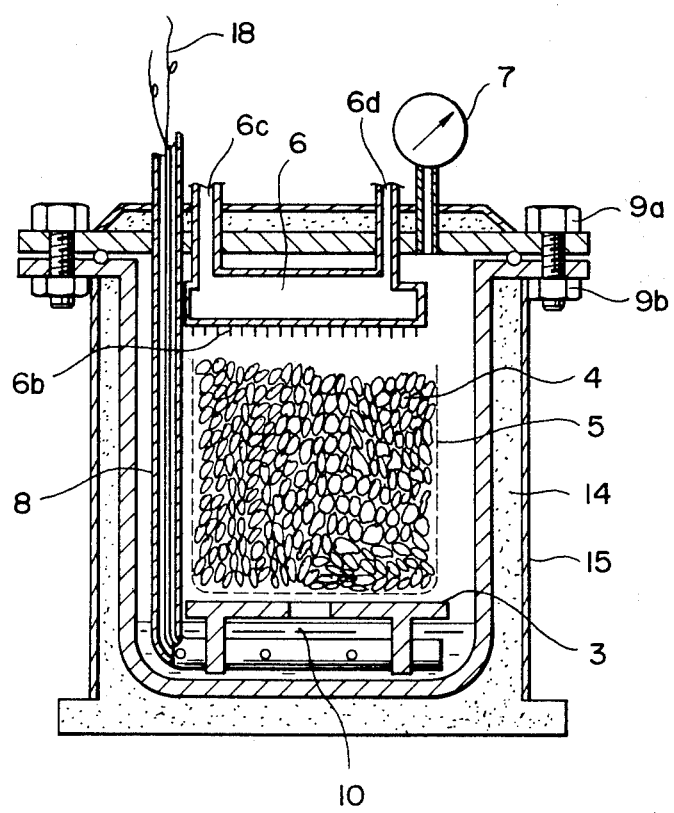
FIG. 6 is a view in vertical section of the manufacturing equipment used in a ninth process of the invention.

In the apparatus used in this example, as illustrated in FIG. 6, the steam supply pipes 12, 12' of FIG. 5 were removed. Water 10 filling the drain area of the apparatus was heated and evaporated by the heater 8 for recycling so that water consumption could be minimized.

In this example, the autoclave 1 was charged with the alumina granules of Example 1 and water. Then in the same manner as in Example 6 at a curing temperature of 160° C. and saturated steam pressure of 6.3 kg/cm², the granules were heated for 20 hours. During the last 4 hours Na₂O was removed by circulation of cooling water of 15° C. through the tube 6 to wash the granules with condensed water droplets from tube 6. The temperature of the cooling water at the discharge pipe 6d of tube 6 was 35° C.

When the washing was finished, the drain water remaining in the autoclave 1 amounted to 600 cc. The alumina granules thus washed were treated in the same way as in Example 5, yielding alumina granules containing 0.05% of Na₂O.

As described above, alumina granules with little Na₂O content can be obtained and accordingly a very strong catalyst carrier can be made from them, according to the technique of the present invention for manufacturing low-soda alumina granules.

EXAMPLE 10

The manufacturing apparatus used in this example (not shown) includes an autoclave and an anti-pressure lid. A metal-screen case holding the alumina granules to be washed is set on a draining stand within the autoclave. Pipes to charge and discharge steam or hot water are connected to the autoclave. A pressure gauge to measure the pressure within this autoclave is fitted to the anti-pressure lid. The apparatus is heated by a heater provided outside of the autoclave. The autoclave and the lid are bolted together with a bolt and a nut.

For washing the alumina grains in the apparatus, the granules are placed in the metal-screen case set on the draining stand. Then, the lid is secured to the autoclave with the bolt and nut using packing, so the autoclave is sealed.

Next hot water is supplied through the pipe to fill the autoclave. The apparatus is heated by the heater to vaporize the water in the apparatus. Thus washing is done with saturated steam at a temperature over 100° C.

Alumina granules are obtained by roasting for about one second in a hot gas of 300–700° C. aluminum hydroxide (size: 40μ) with the composition as listed in Table 1 which has been produced by Bayer method, and thereafter crushed for 20 minutes in a vibration mill into active alumina powder of 5μ in average size, which is then transformed into granules of 2.5–4.5 mm in size by a dish-type granulating machine.

The grains thus obtained are left to stand in the atmosphere for 5 minutes to one hour for hydration (times shown in Table 4). Thereupon, 5μ of these granules are charged into the apparatus to be washed and cured in the autoclave at various temperatures for 10 hours.

After removal from the autoclave, these granules are dried for 3 hours at 120° C., followed by three hours of roasting, of different batches, respectively, at 850° C. and at 1100° C. The strength and Na₂O content of the respective granules was measured. The ratio of powder passed through a 9-mesh sieve after drying is taken as the disintegration of the granules. The results are summarized in Table 4.

TABLE 4

Strength, Na₂O content and disintegration of alumina granules

| Sample | Sample No. | Time left in atmosphere | Water cure in autoclave Temperature (°C.) | Time (hr) | Crush strength (Kg/granule) after 3 hr of roasting 850° C. | 1100° C. | Na₂O Content* | Disintegration (%)** |
|---|---|---|---|---|---|---|---|---|
| Control | A-1 |  | 100 | 10 | — | — | 0.32 | 100 |
|  | A-2 | less | 125 | " | — | — | 0.26 | 100 |
|  | A-3 | than | 150 | " | — | — | 0.10 | 100 |
|  | A-4 | 5 min | 175 | " | — | — | 0.09 | 100 |
|  | A-5 |  | 200 | " | — | — | 0.07 | 100 |
|  | A-6 |  | 100 | " | — | — | 0.34 | 85 |
|  | A-7 |  | 125 | " | — | — | 0.24 | 70 |
|  | A-8 | 10 | 150 | " | — | — | 0.09 | 80 |
|  | A-9 | min | 175 | " | — | — | 0.07 | 75 |
|  | A-10 |  | 200 | " | (kg/granule) |  | 0.06 | 65 |
| Present invention | A-11 |  | 100 | " | 8.5 | 2.6 | 0.35 | 5 |
|  | A-12 |  | 125 | " | 6.0 | 3.2 | 0.26 | 2 |
|  | A-13 | 15 | 150 | " | 5.8 | 4.0 | 0.10 | 4 |
|  | A-14 | min | 175 | " | 4.5 | 4.4 | 0.07 | 5 |
|  | A-15 |  | 200 | " | 3.6 | 4.2 | 0.06 | 1 |
|  | A-16 |  | 100 | " | 9.1 | 2.4 | 0.37 | 0 |
|  | A-17 |  | 125 | " | 6.2 | 3.3 | 0.23 | 0 |
|  | A-18 | 1 hr | 150 | " | 5.5 | 4.1 | 0.09 | 0 |
|  | A-19 |  | 175 | " | 4.0 | 4.0 | 0.08 | 0 |
|  | A-20 |  | 200 | " | 3.8 | 4.6 | 0.07 | 0 |

*Na₂O content is given on alumina basis.
**Disintegration is indicated as percentage of 9-mesh pass powder.

For the purpose of hydrating aluminum hydroxide granules by leaving them in the atmosphere, 18 l of them have only to be left to stand in a container. In 15 minutes of granulation, the granules develop a high heat of hydration and thereafter they will not disintegrate even if immersed in water or hot water.

EXAMPLE 11

Alumina granules are obtained in the same way as in Example 10 except that they are left standing in the atmosphere for 24 hours before they are charged into the autoclave. Then with 10 l of hot water supplied through the pipe, all valves are closed. Electric current is passed to the heater, referring to the pressure gauge and an electromotive force meter, so that the autoclave is at a pressure of 4.85 kg/cm$^2$ (equivalent to 150° C. for saturated steam).

After 8 hours of heating the pipe is opened to gradually discharge and reduce the residue of hot water without decreasing the pressure and temperature. Thereafter via the pipe a vaporized ion-exchange water or hot water is supplied to the autoclave. This process is repeated 1-5 times, followed by the after treating as in Example 10. The strength and Na$_2$O content of alumina granules thus obtained were measured, the results being summarized in Table 5.

TABLE 5

Verification test of the effect of hot water exchange in autoclave

| Sample No. | Times of Water Exchange | Crush strength (kg/granule) | | Na$_2$O Content (%) |
|---|---|---|---|---|
| | | After roasting 850° C. - 3 hrs. | After roasting 1100° C. - 3 hrs | |
| B-1 | 1 | 6.2 | 5.5 | 0.03 |
| B-2 | 2 | 6.3 | 6.9 | 0.01 |
| B-3 | 3 | 6.3 | 7.0 | 0.01 |
| B-4 | 5 | 6.4 | 6.8 | 0.005 |
| A-13 | 0 | 5.8 | 4.0 | 0.10 |

EXAMPLE 12

In this example, hydration is done by steam in the autoclave instead of by stillstanding in the atmosphere as in Example 10.

Five liters of aluminum hydroxide granules obtained by the preliminary roasting and crushing of Example 10 are charged in the autoclave just as in Example 10. Thereafter, steam is sent via the pipe and 1-3 hours of hydration is done in a saturated stream of 100-150° C. When the heat of the steam is insufficient, the autoclave is further heated by the heater.

Next 10 l of ion-exchange water is supplied via the pipe. Then for 4-7 hours at 100°-175° C. the granules are washed and cured with the ion-exchange water. Finally in the same way as in Example 10, the strength and Na$_2$O content of the granules obtained are measured, the results being summarized in Table 6.

TABLE 6

Strength and Na$_2$O content of alumina granules hydrated in autocalve

| | Hydrating conditions in autoclave | | Wash, cure conditions in autoclave | | Crush strength (kg/granule) | | Na$_2$O Content (%) |
|---|---|---|---|---|---|---|---|
| Sample No. | Temperature (°C.) | Time (hr) | Temperature (°C.) | Time (hr) | After 850° - 3 hr | After 1100° - 3 hr | |
| C-1 | 100 | 3 | 100 | 7 | 9.2 | 3.1 | 0.31 |
| C-2 | 100 | 3 | 125 | 7 | 10.2 | 6.5 | 0.24 |
| C-3 | 100 | 3 | 150 | 7 | 7.0 | 6.5 | 0.14 |
| C-4 | 100 | 3 | 175 | 7 | 5.3 | 5.8 | 0.09 |
| C-5 | 125 | 2 | 100 | 8 | 9.5 | 3.4 | 0.23 |
| C-6 | 125 | 2 | 125 | 8 | 8.0 | 5.9 | 0.20 |
| C-7 | 125 | 2 | 150 | 8 | 7.2 | 6.2 | 0.17 |
| C-8 | 150 | 1 | 100 | 9 | 10.0 | 3.4 | 0.12 |
| C-9 | 150 | 1 | 125 | 9 | 11.2 | 9.5 | 0.11 |
| C-10 | 150 | 1 | 150 | 9 | 7.1 | 8.0 | 0.10 |
| C-11 | 150 | 1 | 150 | 4 | 8.0 | 7.0 | 0.13 |

EXAMPLE 13

Alumina granules after autoclave hydration by steam as in Example 12 are dried at the various temperatures of Table 7, between room temperature and 600° C. and are washed and cured in the autoclave. The subsequent process is the same as in Example 10. The strength and Na$_2$O content of granules obtained are measured, the results being summarized in Table 7.

TABLE 7

Strength and Na$_2$O content of alumina granules hydrated and then dried

| Sample No. | Hydration conditions in autoclave | Drying temperature (°C.) | Wash, cure conditions in autoclave | Crush strength (kg/granule) | | Na$_2$O content (%) |
|---|---|---|---|---|---|---|
| | | | | After 850° - 3 hr | After 1100° C. - 3 hr | |
| D-1 | 120° C. × 3 hr | Room temp. | 120° C. × 7 hr | 11.3 | 6.5 | 0.24 |
| D-2 | 120° C. × 3 hr | 100 | 120° C. × 7 hr | 10.5 | 7.6 | 0.18 |
| D-3 | 120° C. × 3 hr | 200 | 120° C. × 7 hr | 11.3 | 7.5 | 0.16 |
| D-4 | 120° C. × 3 hr | 300 | 120° C. × 7 hr | 12.1 | 7.9 | 0.14 |
| D-5 | 120° C. × 3 hr | 400 | 120° C. × 7 hr | 8.3 | 7.6 | 0.11 |
| D-6 | 120° C. × 3 hr | 500 | 120° C. × 7 hr | 6.5 | 5.3 | 0.10 |
| D-7 | 120° C. × 3 hr | 600 | 120° C. × 7 hr | 5.1 | 4.1 | 0.09 |
| D-8 | 120° C. × 3 hr | 700 | 120° C. × 7 hr | 4.9 | 4.1 | 0.08 |
| D-9 | 120° C. × 3 hr | 800 | 120° C. × 7 hr | 4.7 | 4.3 | 0.09 |
| D-10 | 120° C. × 3 hr | 900 | 120° C. × 7 hr | 4.9 | 4.4 | 0.10 |
| C-6 | 125° C. × 2 hr | — | 125° C. × 8 hr | 8.0 | 5.9 | 0.20 |

It can be seen from Table 7 that, as compared with Samples D-2 to D-5 dried at 100° to 400° C., Samples D-1 and C-6, which are not subject to drying after hydration treatment within the autoclave, have larger contents of sodium residue and the crush strengthes of D-1 and C-6 after firing at 1100° C. for 3 hours are smaller.

As described above, adoption of the manufacturing method and apparatus of low-soda alumina granules according to the present invention will yield alumina granules with little content of $Na_2O$, from which a high strength catalyst carrier can be obtained.

This application is related to application in Japan No. Sho 52-015685 filed Feb. 16, 1977, and No. Sho 52-060219 filed May 24, 1977, and their disclosure is incorporated herein by reference.

What is claimed is:

1. Low-soda alumina granules manufacturing apparatus comprising
    an autoclave,
    a pressure resistant lid for maintaining a high pressure environment in said autoclave,
    said autoclave having a perforated case therein in which alumina granules to be washed and cured are placed, said case being positioned on a draining stand supported on the bottom of the said autoclave;
    said autoclave having therein before the start of operation, water in an amount sufficient to evaporate into steam saturating the inside of said autoclave;
    said autoclave also including heating means to heat said water within the autoclave to evaporate the water into steam; and
    said lid being provided with condenser means through which cooling water is circulated to condense steam in the autoclave to water;
    said condenser means comprising a condensing surface above the granules through which the cooling water passes and circulates to cool down said condensing surface of said condenser means to condense steam surrounding said surface to form droplets of water which fall and drop onto the alumina granules in the perforated case;
    said water falling down onto the bottom of said autoclave after washing and passing through the granules being re-evaporated into steam by said heating means.

2. Apparatus according to claim 1, wherein said condenser means includes an interior coolant guide.

3. Apparatus according to claim 1, wherein said condenser means includes an exterior fin.

4. Apparatus according to claim 1, wherein said heating means is provided on the outside of said autoclave.

5. Apparatus according to claim 1, wherein said heating means is provided on the inside of said autoclave.

* * * * *